3,382,277
PROCESS FOR RECOVERING AN ALKALI
METAL STYRENE SULFONATE FROM
AN AQUEOUS MEDIUM
Rudolph Pick, Metuchen, N.J., assignor to E. I. du Pont de Nemours and Company, Wilmington, Del., a corporation of Delaware
No Drawing. Filed May 14, 1965, Ser. No. 455,993
7 Claims. (Cl. 260—505)

This invention relates to a novel method for recovering styrene sulfonate salt values from aqueous mother liquors containing the same. More particularly, the present invention relates to a method for recovering sodium styrene sulfonate from an aqueous medium containing the same in combination with appreciable amounts of sodium chloride and sodium bromide.

Sodium styrene sulfonate is currently produced on a commercial scale as a chemical intermediate. This intermediate is made by a process comprising the steps of reacting styrene with hydrogen bromide to selectively form β-bromoethylbenzene; sulfonating the latter with sulfur trioxide; neutralizing the sulfonated β-bromoethylbenzene so formed with caustic; and splitting out hydrogen bromide from the aqueous reaction mixture and neutralizing it with caustic. Sodium chloride is then added to the reaction mixture to aid in the crystal growth of the sodium styrene sulfonate and finally the product is separated as solid crystals from the aqueous medium by a standard filtration technique. Of course, the same process can be readily employed to prepare other alkali metal salts of styrene sulfonate by replacing the caustic in the neutralizing step with a different alkali metal hydroxide. It will also be understood that other alkali metal halid salts may be used in place of sodium chloride to aid in the salting-out step of the styrene sulfonate salt.

The mother liquor of filtrate resulting from the filtration step described in the above process scheme contains a dissolved product which is usually equivalent to about 10% of the styrene sulfonate salt in the process. Heretofore, these sizable quantities of styrene sulfonate salt in this filtrate stream have been lost to waste since no economical means for recovery have been found. Of course, in addition to the dissolved styrene sulfonate salt, it will be clear from the above description that the mother liquor also contains appreciable amounts of the alkali metal halide salt added to aid in the crystallization of the product and an alkali metal bromide which forms during the process.

According to the present invention the styrene sulfonate salt is removed with highly surprising efficiency from the aqueous mother liquor containing it by contacting the aqueous mother liquor with an ion-exchange resin of a special class to absorb the styrene sulfonate salt on said resin and thereafter removing said salt from said resin containing it absorbed thereon by passing an aqueous desorbing medium into contact with said resin.

The aqueous mother liquor threated by the method of the invention can contain an amount of styrene sulfonate salt ranging up to that amount which can remain in solution at the temperature the filtration step is carried out. Usually, the amount of styrene sulfonate salt will be in a range of from about 1.0% to about 2.5% by weight. As indicated, the aqueous mother liquor also contains an appreciable amount of an alkali metal halide, preferably sodium chloride, added at an earlier stage to salt out the styrene sulfonate salt and an alkali metal bromide, the alkali metal in both cases corresponding to the metal cation of the alkali metal hydroxide used in preparing the styrene sulfonate salt. Generally, the amount of the alkali metal chloride is in a range of from about 10 to 20% by weight and the amount of the alkali metal bromide is in a range of from about 5 to 10% by weight.

The class of iron-exchange resins found to provide outstanding utility in the method of the invention are weakly basic anion-exchange resins which are prepared by reacting, by aminolysis, a polyamino compound which contains at least one primary amino group with an insoluble, cross-linked copolymer of an ester of acrylic acid or methacrylic acid. This class of weakly basic anion-exchange resins and methods for preparing them are fully set forth in U.S. Patent 2,675,359 which is incorporated herein by reference for an understanding of this feature of the present invention.

Briefly stated, these resins are obtained by reacting at a temperature from 140° C. to 250° C. (a) a cross-linked copolymer of 80–99% on a molar basis of an ester having the general formula $$CH_2=CRCOOR'$$

where R is a member of the class consisting of a hydrogen atom and a methyl group and R' is a monovalent hydrocarbon radical containing 1–8 carbon atoms, and 1–20% on a molar basis of a copolymerizable material from the class consisting of divinylbenzene, trivinylbenzene, divinyltobrene, divinylethylbenzene, divinylxylene, divinylnaphthalene, and N,N'-methylene bisacrylamide, and (b) a polyamine which contains at least one primary amino group. During the reaction, the polyamine component (a) above is present in a ratio greater than one mole per mole of the ester and copolymerizable compound of component (a) above.

The preferred resins for use in the method of the invention are those prepared by copolymerizing an ester selected from the group consisting of ethyl acrylate and methyl methacrylate with divinylbenzene and reacting the cross-linked copolymer thus obtained with a polyamine selected from the group consisting of diethylenetriamine, triethylenetetramine, and dimethylaminopropylamine.

The contacting between the ion-exchange resin and the aqueous mother liquor can be by any convenient conventional apparatus and method. Thus, the contacting can be conducted batchwise in a conventional two stage column containing a fixed bed of resin. In this scheme, the first stage involves adsorption and the second stage involves desorption. Alternatively, a three column system each containing a fixed bed of resin can be employed. In this scheme, one column is undergoing regeneration by passing a desorbing medium through it while an adsorption cycle is carried out in the other two columns by passing aqueous mother liquor containing styrene sulfonate salt into contact with the resin beds present therein. A still further embodiment involves a continuous system in which the aqueous mother liquor is brought into contact with a counter-current moving bed of ion-exchange resin during a first portion of its route in closed loop and during a second phase of this route the bed is desorbed by contacting it with an aqueous desorbing medium. The temperature of the contacting during this adsorption step is not critical and may be maintained at ambient conditions for convenience.

The desorbing medium can be water or a dilute aqueous solution of an alkali metal hydroxide containing about 0.5 to 10% by weight hydroxide, preferably caustic. The desorption step is carried out at a temperature between 5 and 70° C., preferably in the range of from about 20° C. to 60° C. since it is found that less desorbing medium is required under these latter conditions.

A very surprising aspect of the method of the invention is the small amount of aqueous desorbing medium required to desorb the styrene sulfonate salt from the resin. Due to this feature of the invention, it is possible to obtain a concentration of the styrene sulfonate salt in the desorbing medium that is 2 to 4 times higher than in the original aqueous mother liquor. It is also surprising that the resin operates reversibly in the process as it does for the styrene sulfonate salt in the presence of inorganic salts so that one recovers the organic salt per se at levels approaching theoretical. As a further surprising aspect, it is found that the aqueous mother liquor can be acid, alkaline, or neutral when treated in accordance with the method of the invention without significantly interfering with the absorption of the styrene sulfonate on the resin.

The invention will be better understood but is not intended to be limited by the following illustrative examples. All percentages are percentages by weight unless otherwise indicated.

EXAMPLE 1

An ion-exchange column about 60 inches long and 1 inch in diameter is filled with 50 milliliters of a resin prepared by reacting diethylenetriamine and a cross-linked copolymer of 90–97% on a mole basis of ethyl acrylate and 3–10% on a molar basis of divinylbenzene, wherein the ratio of the amine during reaction is greater than one mole per mole of ethyl acrylate and divinylbenzene in the copolymer. Operating this column as a two stage batch system, 1,000 milliliters of aqueous mother liquor containing 1.8% sodium styrene sulfonate, 15% sodium chloride and 8% sodium bromide are passed through the bed. The aqueous medium leaving the column contains only 0.1 sodium styrene sulfonate. The resin is subsequently rinsed with 500 milliliters of water and the effluent analyzed. It contains 3.4% sodium styrene sulfonate representing a recovery of about 95% theoretical. The loading and subsequent rinsing with water to elude the absorption of sodium styrene sulfonate was repeated five times, obtaining similar results.

The above run was repeated with similar results substituting as the resin used, a resin prepared by reacting triethylenetetramine with a cross-linked copolymer of 90–97% on a molar basis of ethyl acrylate and 3–10% on a molar basis of divinylbenzene.

The original run was repeated a second time with similar results substituting as the resin used, a resin prepared by reacting dimethylaminopropylamine with a cross-linked copolymer of 90–97% on a molar basis of ethyl acrylate and 3–10% on a molar basis of divinylbenzene.

EXAMPLE 2

A continuous counter-current moving bed ion exchange unit is loaded with the same resin employed in the original run of Example 1. In this system of operation absorption and desorption of sodium styrene sulfonate on a resin are carried out simultaneously. The mother liquor passed in counter-current contact with the resin moving bed of resin contains 1.8% sodium styrene sulfonate, 15% sodium chloride and 8% sodium bromide. The desorping medium is a very weak caustic solution (about 2% by weight NaOH), the desorbing liquor contains 10% by weight sodium styrene sulfonate representing a recovery of about 95% theoretical and the stripped mother liquor 0.1% by weight sodium styrene sulfonate.

The above run was repeated with similar results substituting as the resin used a resin prepared by reacting diethylenetriamine with a cross-linked copolymer of 90–97% on a molar basis of methyl methacrylate and 3–10% on a molar basis of divinylbenzene in a ratio greater than one mole of said amine per mole of methyl methacrylate and divinylbenzene in said copolymer.

The run was repeated a second time with similar results substituting as the resin used, a resin prepared by reacting triethylenetetramine and a cross-linked copolymer of 90–97% on a molar basis of methyl methacrylate and 3–10% on a molar basis of divinylbenzene in a ratio greater than one mole of said amine per mole of methyl methacrylate and divinylbenzene in said copolymer.

Although the method of the present invention has been shown in connection with the recovery of alkali metal salts of styrene sulfonate, it is believed the principles of the invention also are applicable to the recovery of other aryl alkylene sulfonate salts and to aryl alkyl sulfonate salts in the presence of water-soluble inorganic halide salts. It is believed the appreciable amounts of halides in the aqueous medium treated exert a beneficial influence on the method of the invention.

Since many different embodiments of the invention may be made without departing from the spirit and scope thereof, it is to be understood that the invention is not limited by the specified illustrations except to the extent defined in the following claims.

I claim:
1. A method for recovering an alkali metal styrene sulfonate metal salt from an aqueous medium containing the same and water-soluble inorganic alkali metal halides comprising passing said aqueous medium into contact with a weakly basic anion-exchange resin to absorb said styrene sulfonate metal salt on said resin; and removing said styrene sulfonate metal salt from said resin on which it is absorbed by passing an aqueous desorbing medium selected from the group consisting of water and aqueous solutions of an alkali metal hydroxide into contact with said resin; said resin being prepared by reacting at a temperature of from 140° C. to 250° C. (a) a cross-linked copolymer of 80–99% on a molar basis of an ester having the general formula $CH_2$=CRCOOR′, in which R is a member of the class consisting of a hydrogen atom and a methyl group and R′ is a monovalent hydrocarbon radical containing 1–8 carbon atoms, and 1–20% on a molar basis of a copolymerizable material from the class consisting of divinylbenzene, trivinylbenzene, divinyltoluene, divinylethylbenzene, divinylxylene, divinylnaphthalene and N,N′-methylene bisacrylamide, and (b) a polyamine which contains at least one primary amino group, said polyamine being present during the reaction in a ratio greater than one mole per mole of said ester and said copolymerizable compound in said copolymer.

2. A method of recovering sodium styrene sulfonate from an aqueous mother liquor containing the same in combination with sodium chloride and sodium bromide comprising contacting said aqueous mother liquor with a weakly basic anion-exchange resin to absorb said sodium styrene sulfonate on said resin and removing said resin; and removing said sodium styrene sulfonate from said resin on which it is absorbed by contacting said resin with water at a temperature in the range of from 5° C. to 70° C.; said resin being (a) a cross-linked copolymer of 80–99% on a molar basis of an ester having the general formula $CH_2$=CRCOOR′, in which R is a member of the class consisting of a hydrogen atom and a methyl group and R′ is a monovalent hydrocarbon radical containing 1–8 carbon atoms, and 1–20% on a molar basis of a copolymerizable material from the class consisting of divinylbenzene, trivinylbenzene, divinyltoluene, divinylethylbenzene, divinylxylene, divinylnaphthalene and N,N′-methylene bisacrylamide, and (b) a polyamine which contains at least one primary amino group, said polyamine being present during the reaction in a ratio greater than one mole per mole of said ester and said copolymerizable compound in said copolymer.

3. The method of claim 2 wherein said resin is prepared by reacting at a temperature from 140° C. to 250° C. (a) diethylenetriamine and (b) a cross-linked copolymer of 90–97% on a molar basis of ethyl acrylate and 3–10% on a molar basis of divinylbenzene, said amine being present during the reaction in a ratio greater than one mole per mole of ethyl acrylate and divinylbenzene in said copolymer.

4. The method of claim 2 wherein said resin is prepared by reacting at a temperature from 140° C. to 250° C. (a) triethylenetetramine and (b) a cross-linked copolymer of 90–97% on a molar basis of ethyl acrylate and 3–10% on a molar basis of divinylbenzene, said amine being present during the reaction in a ratio greater than one mole per mole of ethyl acrylate and divinylbenzene in said copolymer.

5. The method of claim 2 wherein said resin is prepared by reacting at a temperature from 140° C. to 250° C. (a) dimethylaminopropylamine and (b) a cross-linked copolymer of 90–97% on a molar basis of ethyl acrylate and 3–10% on a molar basis of divinylbenzene, said amine being present during the reaction in a ratio greater than one mole per mole of methyl methacrylate divinylbenzene in said copolymer.

6. The method of claim 2 wherein said resin is prepared by reacting at a temperature from 140° C. to 250° C. (a) diethylenetriamine and (b) a cross-linked copolymer of 90–97% on a molar basis of methyl methacrylate and 3–10% on a molar basis of divinylbenzene, said amine being present during the reaction in a ratio greater than one mole per mole of methyl methacrylate and divinylbenzene in said copolymer.

7. The method of claim 2 wherein said resin is prepared by reacting at a temperature from 140° C. to 250° C. (a) triethylenetetramine and (b) a cross-linked copolymer of 90–97% on a molar basis of methyl methacrylate and 3–10% on a molar basis of divinylbenzene said amine being present during the reaction in a ratio greater than one mole per mole of methyl methacrylate and divinylbenzene in said copolymer.

References Cited
UNITED STATES PATENTS

| | | | |
|---|---|---|---|
| 2,675,359 | 4/1954 | Schneider | 260—86.7 |
| 2,821,549 | 1/1958 | Mock | 260—505 |

OTHER REFERENCES

Rohm & Haas Co., Amber-Hi-Lites, No. 54 (November 1959), pp. 1–4. (Copy in Group 120.)

LORRAINE A. WEINBERGER, *Primary Examiner.*

M. WEBSTER, *Assistant Examiner.*

UNITED STATES PATENT OFFICE
CERTIFICATE OF CORRECTION

Patent No. 3,382,277　　　　　　　　　　　　　　May 7, 1968

Rudolph Pick

It is certified that error appears in the above identified patent and that said Letters Patent are hereby corrected as shown below:

Column 5, line 11, "methyl methacrylate" should read -- ethyl acrylate and --.

Signed and sealed this 23rd day of September 1969.

(SEAL)
Attest:

Edward M. Fletcher, Jr.　　　　　　　　　　　WILLIAM E. SCHUYLER, JR.
Attesting Officer　　　　　　　　　　　　　　Commissioner of Patents